March 12, 1935.   W. J. MICHELET   1,994,044
COMBINATION KITCHEN EQUIPMENT CABINET
Filed Sept. 30, 1931   2 Sheets-Sheet 1

Inventor:
WILHELM J. MICHELET
By John H Brezina
Attorney.

March 12, 1935.  W. J. MICHELET  1,994,044
COMBINATION KITCHEN EQUIPMENT CABINET
Filed Sept. 30, 1931  2 Sheets-Sheet 2
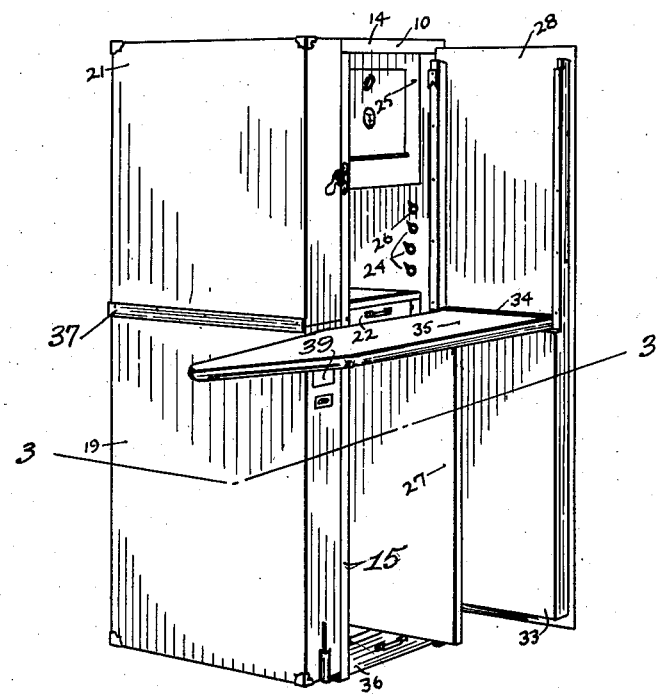
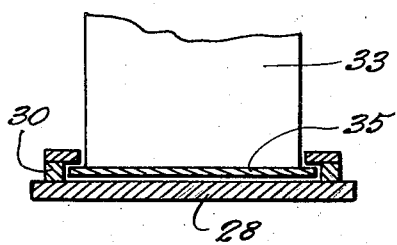
Inventor:
WILHELM J. MICHELET
By John H Brezina
Attorney.

Patented Mar. 12, 1935

1,994,044

UNITED STATES PATENT OFFICE 1,994,044

COMBINATION KITCHEN EQUIPMENT CABINET

Wilhelm J. Michelet, Waukegan, Ill.

Application September 30, 1931, Serial No. 565,973

8 Claims. (Cl. 68—10)

This invention relates to a highly improved combination kitchen equipment cabinet which embodies all the necessary elements to provide a unit permitting complete preparation of a meal without moving away from it. My combination cabinet may be conveniently closed to form a compact closed unit when not in use, and the arrangement of parts is such that they cooperate to provide a convenient, compact and sanitary furniture unit, as will be more specifically hereinafter described.

An object of my invention is the provision of a combination kitchen equipment cabinet which comprises a cabinet section formed about an upright frame and having hinged sections adapted to provide storage space for cooking utensils and the like, said hinged sections when closed forming the sides of the cabinet, and the lower section when open forming a support for a slidable working board.

A further object of this invention is the provision of the combination of a kitchen cabinet unit having hinged side sections and front inner and outer doors, said outer door having an ironing board slidably mounted therein and said inner door being adapted to support said ironing board and slidably mounted cooking elements when in working position.

A further object of my invention is the provision of a combination kitchen equipment cabinet having a drawer therein with electrical heating elements mounted in said drawer, and having hinged side sections and a front door having a concealable and slidable ironing board mounted adjacent its inside surface, and said door having an inner slidable panel adapted to conceal and protect the upper portion of said board.

A further object of my invention is the provision of a combination kitchen equipment cabinet which embodies hinged storage sections, heating elements, hinged work board, and collapsible ironing board, which is capable of being quickly and easily closed to form a compact unit and which can be economically manufactured with a small number of parts.

Other and further important objects of this invention will be apparent from the disclosures in the specification and the accompanying drawings.

This invention (in a preferred form) is illustrated in the drawings and hereinafter more fully described.

On the drawings:

Fig. 2 is a perspective elevational view of my combination kitchen cabinet with side sections closed and showing the ironing board in working position.

Fig. 4 is an enlarged fragmentary view showing the door 26 in cross section and illustrating a fragment of the ironing board in lowered position.

As shown on the drawings:

Figure 1:
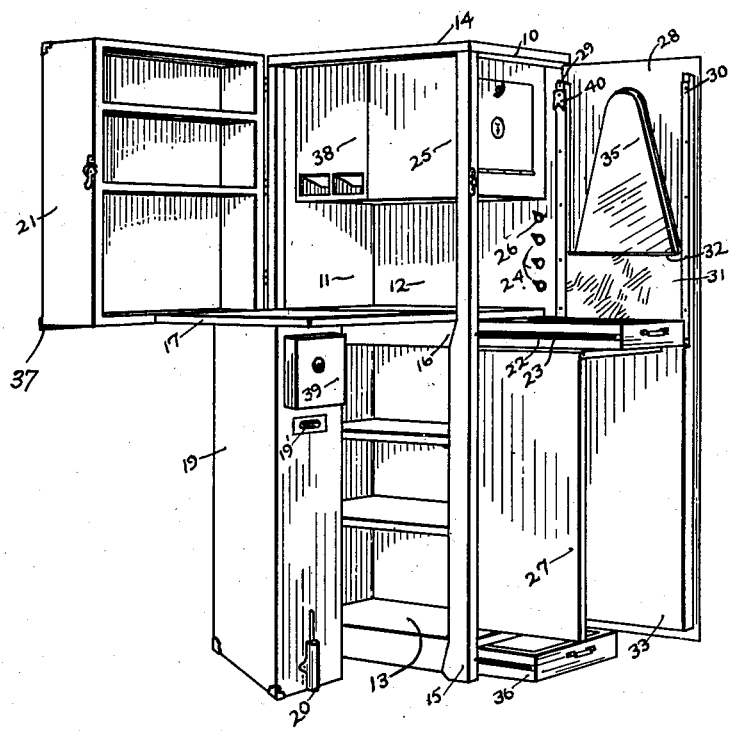
Fig. 1 shows a perspective elevational view of my combination kitchen cabinet showing the upper side section open, the working board lowered, the lower side section partially open, and the front door open with its collapsible ironing board partially concealed adjacent its inside surface.
Figure 3:
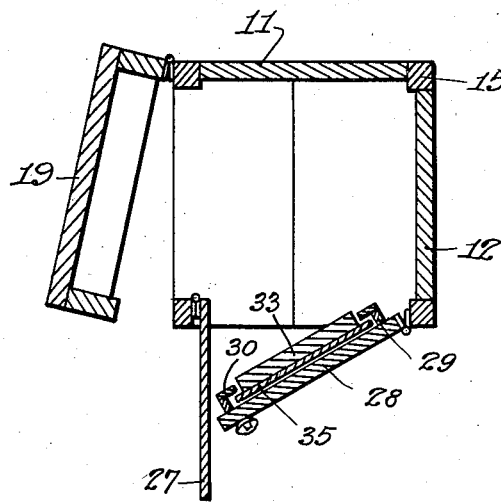
Fig. 3 is a cross sectional view taken on line III—III of Fig. 2.

The reference numeral 10 indicates a cabinet section, preferably of wood, having a vertical rear wall 11, a vertical side wall 12, a base 13, top 14, and four upright standards 15 connecting the free corners of the base 13 and top 14, only one of which standards is shown in Fig. 1. Said parts are permanently secured together by suitable joints and screws in a manner well known in the art. The front and left side are left open to be closed by means hereinafter described.

A cross piece 16 connects the edges of the rear wall 11 and one of the front vertical standards 15 at a point substantially midway between the top 14 and bottom 13. A work board 17 is horizontally and hingedly mounted to the cross piece 16 and between the wall 11 and one of the front vertical standards 15 and is of a length less than the height of the upper cabinet section 21 so that it may be raised in vertical concealed position when the cabinet is closed.

The lower compartment of the cabinet has a plurality of horizontal shelves secured therein by suitable means such as screws (not shown) to provide convenient space for food, cooking utensils or other supplies.

A lower rectangular box-shaped cabinet section 19 having a handle 19' has one edge of its side hinged to one of the rear corner standards 15 adjacent the rear wall 11 so as to form a closure for that portion of the open side of the cabinet which is beneath the work board 17, said cabinet section being adapted to be opened to any degree wherein it will support the work board 17 to maintain the same in rigid horizontal position. A foot bolt catch 20 is secured to the outside surface of the cabinet section 19 to permit maintenance of the same at any position desired.

A drawer 39 is slidably mounted in the top portion of cabinet section 19 to open from the side thereof which forms a portion of the front of the cabinet when closed, said drawer being conveniently accessible when the work board is in its lowered working position as shown in Fig. 1.

A rectangular box-like cabinet section 21, substantially similar to section 19, is hingedly secured to rear corner standard 15 in alignment with hinges of section 19 and above said side section 19 and in a position so that when both sections are in substantially the same plane the top of section 19 and the bottom of section 21 will be adjacent each other. Cabinet section 21 is of a size to close the opening above the work board 17. A relatively thin metal strip 37 has its upper longitudinal edge secured at the lower edge of cabinet section 21 by suitable screws, as indicated in Fig. 2, and in such a position so that the lower edge of said strip 37 will descend below the lower edge of said section 21. This strip 37 serves to hold the lower cabinet section 19 in closed and locked position when the cabinet section 21 is locked and requires that the cabinet section 19 be always closed first.

In the preferred form of my invention shown in Fig. 1, a slidable metal drawer 22 is slidably mounted between grooves in the cross piece 16 and wall 12 respectively, and is adapted to be supported and guided in horizontal movement thereof through flange members 23 secured along each side of said drawer, said flange members riding in said grooves. The drawer 22 is adapted to hold cooking or other kitchen accessories (not shown) for example, conventional heating elements, either electrically or gas heated. A number of conventional switches 24 for controlling such elements are shown.

An oven 25, which in the preferred form is electrically heated and controlled by a conventional switch 26 mounted adjacent switches 24, is affixed to the inside surface of the cabinet top 14 and to wall 12 by any well known means such as screws and brackets (not shown). Rearward of said oven 25 is mounted a metal bin 38 having a plurality of compartments (preferably two in number) and having sloping bottoms terminating in an outlet port and a conveniently operable and accessible gate and lever means (not shown) to cause manual discharge of sugar, flour or other contents.

A short door 27 extending from the bottom of the cabinet upwardly to form a support for the drawer 22 has one edge hinged to the inside surface of one of the front standards 15 and is adapted to close the forward opening of the cabinet beneath the drawer 22. A long door 28 is hinged to the front edge of the opposite front standard 15 and extends along the entire front of the cabinet to close the same.

Each of two grooved guide members 29 and 30 comprise two connected members secured together to form right angles in cross section, and are mounted in parallel on opposite sides of the inside of the door 28 so as to form opposed longitudinal grooves. A metal panel 31 having an upper stop flange 32 is slidable in said grooves, and in downward position is concealed behind a permanent panel 33 which is secured against the outside of guide members 29 and 30 over the lower portion of the door 28.

A cross bar 34 having its ends slidably engaging the grooves of said guide members, has secured thereto one end of an ironing board 35, said ironing board being of a length to be placed in a plane parallel to and immediately adjacent the inside surface of the door 28 as shown in Fig. 1.

When it is desired to withdraw the ironing board to working position, the panel 31 is slid downwardly until the top flange 32 engages the upper edge of panel 33; then the board is moved vertically until the cross bar 34 has moved to its extreme upper position, whereupon the board 35 is lowered to horizontal position to rest on the upper edge of the inner door 27 which firmly supports said board. To conceal the board the operator needs only to reverse the foregoing steps.

A small pawl 40 is pivoted on the upper end of guide member 29, said pawl being adapted to be turned manually to engage the flange 32 of the metal panel 31 to hold said panel in upper position.

A bottom drawer 36 is slidable below the bottom 13 between the sides of the cabinet to provide additional storage space.

My invention provides a combination kitchen equipment cabinet which permits all necessities, cooking utensils and accessories and supplies to be within reach of the housewife, as well as providing an electric stove within said unit to permit complete preparation of meals without moving away from the cabinet. My invention further provides a kitchen furniture unit which embodies a concealable ironing board which cooperates with certain parts of said unit to permit highly satisfactory use thereof at a place convenient to the user.

I am aware that many changes may be made and numerous details of construction may be varied through a wide range without departing from the principles of this invention, and I therefore do not purpose limiting the patent granted hereon otherwise than necessitated by the appended claims.

I claim as my invention:

1. An article of kitchen furniture comprising a rectangular frame having four upright standards and one permanent side wall, a permanent rear wall; and an open front; an outer door hinged to said frame forming a closure for the front of said cabinet; a short inner door hinged on the front corner of the frame opposite to the corner on which the outer door is hinged parallel guide elements secured on the longitudinal edges of the inside of said outer door; a cross bar slidable in said guide elements; an ironing board having one end secured to said cross bar and being adapted to be tilted from concealed position adjacent said outer door to horizontal position, said inner door forming a support for said ironing board, and a panel slidable in said guide elements adapted to be slid upwardly to conceal said board when in closed position.

2. An article of kitchen furniture comprising a rectangular frame comprising four upright standards and having an open front and an upper and lower compartment; a short inner door hinged to one front corner upright standard; a longer door hinged on the other front upright standard and adapted to close the entire front of the cabinet; grooved members mounted parallel along the inside surface of said longer door; a cross bar slidable between said grooved members, the ends of said cross bar engaging in said grooves; and an ironing board secured to said cross bar, said ironing board being capable of movement from closed position adjacent the inside surface of said longer door to horizontal position, said inner door being adapted to support said ironing board when in lowered position.

3. An article of kitchen furniture comprising a rectangular frame comprising four upright standards and having a short inner door hinged to one front corner upright standard; a longer door hinged on the other front upright standard and adapted to close the entire front of the cabinet; grooved members mounted parallel along the inside surface of said longer door; a cross bar slidable between said grooved members, the ends of said cross bar engaging in said grooves; an ironing board secured to said cross bar, said ironing board being capable of movement from closed position adjacent the inside surface of said longer door to horizontal position, said inner door being adapted to support said ironing board, and a panel slidable between said grooved members adapted to be moved to extreme upper position to conceal and protect the upper portion of said ironing board.

4. An article of kitchen furniture comprising a rectangular frame comprising four upright standards and having an open front, and an upper and lower compartment; a short inner door hinged to one front corner upright standard; a longer door hinged on the other front upright standard and adapted to close the entire front of the cabinet; grooved members mounted parallel along the inside surface of said longer door; a cross bar slidably mounted between said grooved members, the ends of said cross bar engaging in said grooves; an ironing board secured to said cross bar, said ironing board being capable of movement from closed position adjacent the inside surface of said longer door to horizontal position, said inner door being adapted to support said ironing board.

5. An article of kitchen furniture comprising a cabinet having an open front, and divided into an upper and a lower compartment; a door hinged on the front corner of said cabinet; an ironing board pivotally and slidably mounted on the inside of said door and adapted to be lowered into horizontal position; means mounted on said cabinet to support said board in horizontal position; guide members on the inside of said door; a panel slidable in said guide members and adapted to conceal a portion of said ironing board when in upper position, and a pawl pivoted adjacent one of said guide members adapted to engage said panel to hold the same in upper position.

6. An article of furniture comprising a cabinet having an open front; closure means for said open side; a closure door for said cabinet front; an ironing board mounted on said closure door for vertical and pivotal movement; and an inner door hinged to said cabinet and adapted to close a part of the cabinet front and adapted to support said ironing board in working position.

7. An article of furniture comprising a cabinet having front openings; a closure door for said cabinet front; a mounting member slidably mounted for vertical movement on said door; an ironing board pivoted to said mounting member; and an inner door hinged to said cabinet opposite said first mentioned door adapted when open to support said ironing board in working position.

8. An article of kitchen furniture comprising a cabinet having an open front; a closure door member hinged to said cabinet and adapted to close the lower portion of the cabinet front; a longer door hinged to the front of said cabinet; an ironing board pivotally mounted on the inner surface of said longer door and tiltable horizontally, and a work board mounted in said cabinet, said closure door when open being adapted to support said ironing board when lowered.

WILHELM J. MICHELET.